March 17, 1964   R. T. RACE   3,125,718
BATTERY CHARGE INDICATOR
Filed May 26, 1961
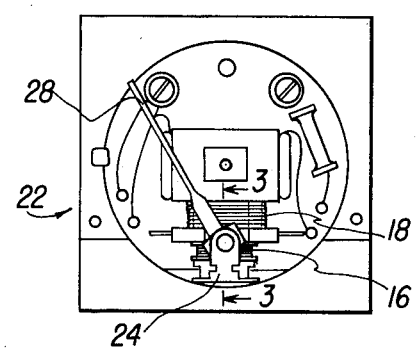
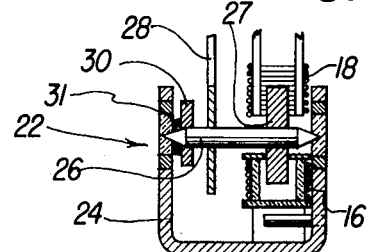
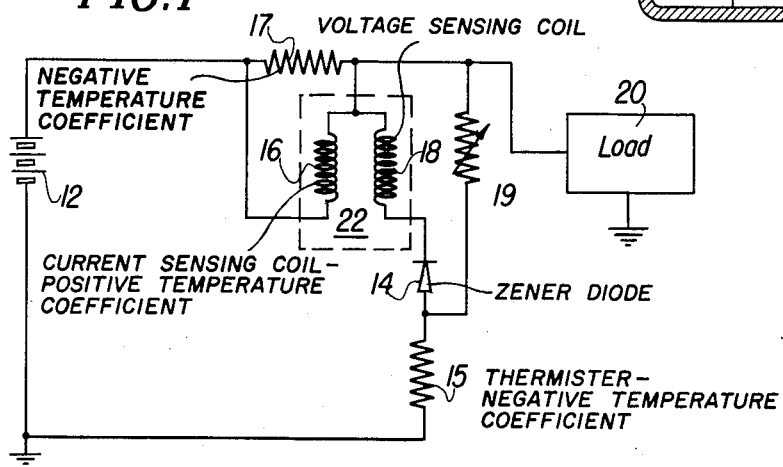
INVENTOR.
Richard T. Race
BY Mueller & Aichele
Attys.

United States Patent Office 3,125,718
Patented Mar. 17, 1964

3,125,718
BATTERY CHARGE INDICATOR
Richard T. Race, Chicago, Ill., assignor to Motorola, Inc., Chicago, Ill., a corporation of Illinois
Filed May 26, 1961, Ser. No. 112,975
7 Claims. (Cl. 324—29.5)

This invention relates to electrical measuring circuits and more particularly to a circuit for measuring the electrical charge of a storage battery.

In the past, simple ammeters and charge indicating lamps have been used in automobiles and the like to indicate whether or not the battery is being charged by the generator. Such a "battery charge indicator" does not show the condition of the battery, but merely indicates whether the battery is being charged or discharged. Accordingly, a simple ammeter or indicator lamp does not permit the operator to determine the condition of charge within the battery itself. In many instances the indicator lamp or ammeter will indicate that the battery is being charged at a proper rate, but the battery might be in bad condition.

It has also been the practice to test multi-cell storage batteries by comparing the conditions of the individual cells of the battery, either by measuring the specific gravities of the electrolyte or by checking the cell voltages. Such testing required stopping the automobile and getting at the battery itself, and also required the use of test equipment which the average operator of an automobile does not have.

It is therefore an object of the present invention to provide a new and improved circuit for indicating the capacity of a storage battery.

It is a further object of this invention to provide a remote battery charge indicator including an indicatng meter for indicating the relative capacity of a storage battery.

Another object of the present invention is to provide a battery charge indicator which may be permanently connected to the battery without causing an appreciable current drain upon the battery.

Still another object of this invention is to provide a battery capacity indicator wherein any fluctuating load upon the battery is balanced to give an over all indication of battery capacity.

A feature of the present invention is the provision of a device for indicating the degree of charge of an automobile storage battery consisting essentially of a voltmeter having a flux sensitive indicator responsive to two coils, wherein one voltage sensing coil is connected across the battery terminals and the second current sensing coil is connected in series with the load.

Another feature of the present invention is the provision of a zener diode connected in series with the voltage sensing coil whereby the voltage across the coil is the difference between the battery voltage and the diode voltage and the indicator gives a large scale indication of the change in voltage.

Still another feature of the present invention is the provision of a battery charge indicator including a negative temperature coefficient resistor connected in series with the zener diode to correct for change in the diode voltage with temperature.

A further feature of this invention is the provision of a battery indicator circuit having voltage and current sensing coils, with the current coil being compensated to correct for the fall off in the battery internal resistance at low temperatures. This may be accomplished by the construction of the current sensing coil itself or by the selection of the shunt used across this coil.

Another feature of this invention is the provision of an indicator including a sintered iron magnetized disc responsive to the sensing coils and having an indicator needle connected thereto to indicate the charge of the automotive storage battery. A highly viscous silicone grease damping fluid may be disposed on a moving part of the indicator so that the indicator needle does not respond to momentary fluctuations.

FIG. 1 is a diagrammatic illustration of the circuit of the present invention;
FIG. 2 illustrates the flux sensitive meter device used with the circuit of FIG. 1; and
FIG. 3 is an enlarged cross-sectional view taken on lines 3—3 of FIG. 2.

An indicating device in accordance with this invention provides an indication of the charge in an automotive storage battery. The device includes a meter with two separate exciting coils. One coil is connected in series with a zener diode across the battery terminals. This diode acts to provide an expanded indication on the meter scale, with deflection starting at about 11.5 volts and full scale at about 13.5 volts (for a nominal 12 volt battery). To correct for the rises in diode voltage with temperature, a negative temperature coefficient resistor is connected in series with the zener diode. The second coil is connected across a resistance in series with the load which ordinarily would include the lights, ignition, and any other electrical apparatus which might draw current from a storage battery. Since the battery voltage falls with the load applied thereto, the additional flux from the second coil tends to hold the meter deflection independent of the load for various conditions of charge. The current coil may have a positive temperature coefficient to compensate for the fall off in the battery internal resistance at low temperature. Alternatively, the resistor which shunts the current coil may have a negative temperature coefficient to increase the current through the current coil at low temperatures.

The "state of charge" indicator of the present invention could be substituted on the instrument panel for a charge lamp or ammeter, and would supply more worthwhile information than such devices as the voltage measurement provides a reliable indication of battery condition. It will be understood that any satisfactory meter can be used in the circuit as long as an adding effect is derived from the flux of the two coils.

Referring now to the drawings, FIG. 1 shows the battery charge indicator circuit of the present invention adapted to indicate the condition of a storage battery 12. The charge of the battery 12 is measured by a two coil meter 22 including a coil 16 and a coil 18. The coil 18 is connected across the terminals of the battery 12 in series with zener diode 14 and thermistor 15. The coil 16 is connected in shunt across resistor 17, in series between the battery 12 and the automobile electrical system or load 20.

The zener diode 14 which is connected in series with coil 18 of the meter 22 produces an expanded indication effect as the coil responds to the difference in the battery voltage and the voltage of the zener diode. For use with a nominal 12 volt battery, the voltmeter deflection may start at about 11.5 volts and full scale deflection will be provided at about 13.5 volts. A negative temperature coefficient resistor 15 is connected in series with the zener diode 14 to compensate for changes in the voltage of the zener diode 14 with changes in temperature. A variable resistor 19 is bridged across the coil 18 and the zener diode 14 to compensate for production variations in the zener diode voltage, and to provide a small adjustment to set the calibration of the meter 22.

A voltage is developed across resistor 17 which varies with the current drawn by the load. This voltage is applied to meter coil 16 so that the meter response is compensated to correct for reduced battery voltage produced by the load current. The coil 16 may have a positive temperature coefficient to correct the current through coil 16 for fall off in the battery internal resistance at low temperature. Alternately, resistor 17 may have a negative temperature coefficient so that more current is provided in coil 16 at low temperatures.

As shown in FIGS. 2 and 3, the indicating meter 22 includes a frame 24, a spindle 26 rotatably mounted on the frame 24, and a magnetic member 27 mounted on the rotatable spindle 26. The magnetic member 27 may be a magnetized sintered iron disc which responds to the flux of the coils 16 and 18 to rotate the spindle 26. The coils 16 and 18 are positioned so that each encompasses a part of the magnetic member to rotate the spindle 26 in accordance with the flux provided by the coils. A needle 28 is also mounted upon the spindle and oscillates in cooperation therewith. A washer 30 is mounted at one end of the spindle 26. The washer 30 is engaged by a high viscosity damping fluid 31, such as silicone grease, to compensate for momentary fluctuations of the needle 28. The needle 28 therefore will respond only to the overall electrical input, and momentary fluctuations such as would occur during starting or switching on or off of accessories are damped out.

The indicator of the present invention provides therefore a "state of charge" indication and can be substituted on the instrument panel of an automobile for the presently used charge lamp or ammeter. The device will supply more worthwhile information to the operator than present indicators, in that all of the major variables which effect the accuracy of the device are controlled and corrected. The circuit can be provided at a comparatively low cost to achieve five to ten percent accuracy of the instrument.

I claim:

1. A circuit for indicating the condition of a storage battery which provides current to a load connected thereto including in combination, a meter including first and second sensing coils, a zener diode and a resistor connected in series with said first coil across the storage battery, said resistor having a negative temperature coefficient to compensate for variation of the zener diode voltage with temperature, and a second resistor series connected between the battery and the load, said second coil of said meter being connected across said second resistor to compensate the meter indication for the current flow from the battery.

2. A circuit for indicating the condition of a storage battery which provides a current to a load connected thereto including in combination, a meter including first and second sensing coils, means including a zener diode connected in series with said first coil across the storage battery, a resistor series connected between the battery and the load, and means connecting said second coil of said meter across said resistor, said meter having an indicator responsive to the flux of said first and second coils, with the flux of said second coil compensating the meter indication for the current flow from the battery.

3. A circuit for indicating the condition of a storage battery which provides current to a load connected thereto including in combination, a meter including first and second sensing coils, a zener diode and a resistor connected in series with said first coil across the storage battery, said resistor having a negative temperature coefficient and acting to compensate for variation of the zener diode voltage with temperature, a second resistor having a negative temperature coefficient series connected between the battery and the load, and means connecting said second coil of said meter across said second resistor, said meter having an indicator responsive to the flux of said first and second coils, with said second coil compensating the meter indication for the current flow from the battery.

4. A circuit adapted to indicate the condition of a storage battery which provides current to a load connected thereto including in combination, meter means including first and second sensing coils, a zener diode connected in series with said first sensing coil across the battery to provide an indication of the difference in the voltage of the battery as compared to the voltage across the zener diode, a resistor having a negative temperature coefficient series connected in circuit with said zener diode to compensate for variations of zener diode voltage with temperature, a second resistor series connected between the battery and the load, means connecting said second sensing coil across said second resistor, and variable resistor means connected across said first coil and said zener diode to adjust for production variations in said zener diode, said meter means including a pivotal spindle and magnetic means and an indicating needle mounted on said spindle, said magnetic means being positioned with respect to said coils to respond to the flux thereof, and damping means for resisting momentary fluctuations of said needle.

5. A circuit adapted to indicate the condition of a storage battery which provides current to a load connected thereto including in combination, meter means including first and second sensing coils and adapted to indicate the degree of charge of the battery, a zener diode and a resistor connected in series with said first sensing coil across the battery terminals to provide an indication of the difference in the voltage of the battery as compared to the voltage across the zener diode, said resistor having a negative temperature coefficient for compensating for variation of zener diode voltage with temperature, a second resistor series connected between the battery and the load, said second sensing coil being connected across said second resistor and having a positive temperature coefficient to compensate for change in the internal resistance of the battery with temperature, and variable resistor means connected across said first coil and said zener diode, said meter means including a pivotal spindle and a magnetic disc and an indicating needle mounted on said spindle, said magnetic disc having portions extending into said first and second coils and responsive to the flux of said coils, and damping means for resisting momentary fluctuations of said needle.

6. A circuit adapted to indicate the condition of a storage battery having a load connected thereto including in combination, a meter including first and second sensing coils adapted to indicate the degree of charge on the battery, a zener diode, circuit means adapted to connect said zener diode and said first sensing coil in series across the storage battery and to connect said second sensing coil between the battery and the load, said meter including a spindle supporting a needle rotatably mounted upon a bearing frame, a flux sensitive member on said spindle positioned in the fields produced by said first and second coils, a washer mounted upon said spindle, and silicone damping means disposed between said washer and said frame to resist momentary fluctuations of said needle.

7. A circuit for indicating the condition of a storage battery which provides a current to a load connected thereto including in combination, a meter including first and second sensing coils, circuit means including conductor means having resistance adapted to connect the load to the battery, a zener diode connected in series with said first coil in a series circuit, means connecting said series circuit to said circuit means so that said zener diode and said first coil are effectively connected across the storage battery, and means connecting said second coil of said meter across at least a portion of said conductor means of said circuit means, said meter having an indicator responsive to the flux of said first and second coils, with the flux of said second coil compensating the meter indication for the current flow from the battery to the load.

References Cited in the file of this patent
UNITED STATES PATENTS 2,763,820     Fiedler _____ Sept. 18, 1956
2,779,442     Bacon _____ Jan. 29, 1957